United States Patent [19]

Boucher

[11] Patent Number: 5,406,840
[45] Date of Patent: Apr. 18, 1995

[54] SUPPLYING FLUID

[75] Inventor: Robert F. Boucher, Sheffield, England

[73] Assignee: British Gas plc, England

[21] Appl. No.: 206,894

[22] Filed: Mar. 7, 1994

Related U.S. Application Data

[63] Continuation of Ser. No. 841,472, Feb. 26, 1992, abandoned.

[30] Foreign Application Priority Data

Mar. 18, 1991 [GB] United Kingdom ................ 9105699

[51] Int. Cl.6 ............................................ G01F 5/00
[52] U.S. Cl. ................................... 73/202; 73/861.19
[58] Field of Search ...................... 73/202, 202.5, 203, 73/118.2, 861.52, 861.61, 861.62, 861.64, 861.19

[56] References Cited

U.S. PATENT DOCUMENTS

| | | | |
|---|---|---|---|
| 2,342,290 | 2/1944 | Miller | 73/202 |
| 3,238,960 | 3/1966 | Hatch, Jr. | 73/861.52 |
| 3,690,171 | 9/1972 | Tippetts et al. | |
| 3,735,752 | 5/1973 | Rodder | 73/204.21 X |
| 3,902,367 | 9/1975 | Grant et al. | |
| 4,050,304 | 9/1977 | Thomas | |
| 4,231,253 | 11/1980 | Ohnhaus et al. | 73/861.62 |
| 4,280,360 | 6/1981 | Kobayashi et al. | |
| 4,369,650 | 1/1983 | Yamamoto et al. | 73/118.2 |
| 4,381,668 | 5/1983 | Sato et al. | |
| 4,610,162 | 9/1986 | Okabayashi et al. | |
| 4,646,575 | 3/1987 | O'Hair et al. | |
| 4,712,996 | 12/1987 | Adams et al. | |
| 4,719,806 | 1/1988 | Craigen et al. | |
| 4,981,035 | 1/1991 | Hall | |
| 4,982,602 | 1/1991 | Stiefel et al. | 73/202.5 |
| 5,038,608 | 8/1991 | Sakai et al. | 73/202 |
| 5,119,672 | 6/1992 | Pfeiffer et al. | 73/118.2 |
| 5,127,173 | 7/1992 | Thurston et al. | 73/861.19 X |

FOREIGN PATENT DOCUMENTS

| | | |
|---|---|---|
| 0251627 | 1/1988 | European Pat. Off. . |
| 0306193 | 8/1988 | European Pat. Off. . |
| 0305134 | 3/1989 | European Pat. Off. . |
| 0208413 | 12/1982 | Japan ............ 73/202.5 |
| 0211014 | 12/1982 | Japan ............ 73/202.5 |
| 1400831 | 7/1975 | United Kingdom . |
| 1453587 | 10/1976 | United Kingdom . |
| 2012414 | 12/1977 | United Kingdom . |
| 1554408 | 10/1979 | United Kingdom . |
| 2092742 | 8/1982 | United Kingdom . |

(List continued on next page.)

OTHER PUBLICATIONS

Measurement and Control, vol. 24, No. 1, Feb. 1991, London GB pp. 5-10; Parkinson, G. J., "Fluidic flow sensors for industrial applications".

(List continued on next page.)

Primary Examiner—Herbert Goldstein
Attorney, Agent, or Firm—Larson and Taylor

[57] ABSTRACT

A package burner has a fan rotatably driven at constant speed. Air from the surrounding atmosphere is induced by the fan through an open end of a conduit which guides the air to the fan from which the air is propelled down an outlet passage to mix as combustion air in a chamber with fuel gas from a gas supply nozzle so that flames issue from the chamber. A valve in the conduit or outlet passage can be set to regulate how much air is supplied as combustion air. A fluidic oscillator has an inlet open to the atmosphere and has an outlet open to the interior of the conduit. The observed frequency of the fluidic oscillator is a function of the flow rate of air through the fluidic oscillator and is also a function of the flow rate of air along the conduit. Therefore the measured frequency of the fluidic oscillator can be used to calculate the amount of combustion air being supplied along the conduit in unit time.

25 Claims, 2 Drawing Sheets

FOREIGN PATENT DOCUMENTS

| | | |
|---|---|---|
| 2129143 | 5/1984 | United Kingdom . |
| 2130906 | 6/1984 | United Kingdom . |
| 2177204 | 6/1985 | United Kingdom . |
| 2168409 | 6/1986 | United Kingdom . |
| 2205947 | 6/1987 | United Kingdom . |
| 2197472 | 5/1988 | United Kingdom . |
| 2237392 | 5/1991 | United Kingdom . |

OTHER PUBLICATIONS

"Relay", Feb. 1991, British Gas Research and Technology.

"The Coanda meter–a fluidic digital gas flowmeter", P. H. Wright, Scientific Services, Gas and Fuel Corporation of Victoria, Melbourne, Victoria, Australia, Nov. 27, 1979.

"Fluidic Flowmeter Scaling Equations", R. Boucher and Cetin Mazharoglu, 2nd International Symposium of Fluid–Control, measurement Mechanics–and Flow Visualisation, 5–9 Sep. 1988, England.

"Performance and Tolerance Characteristics of a Fluid Volume–and Flow–Meter", R. F. Boucher, J. A. K. McGuigan, and A. J. Cox, Seventh Cranfield Fluidics Conference, 12–14 Nov. 1975, Stuttgart, Germany.

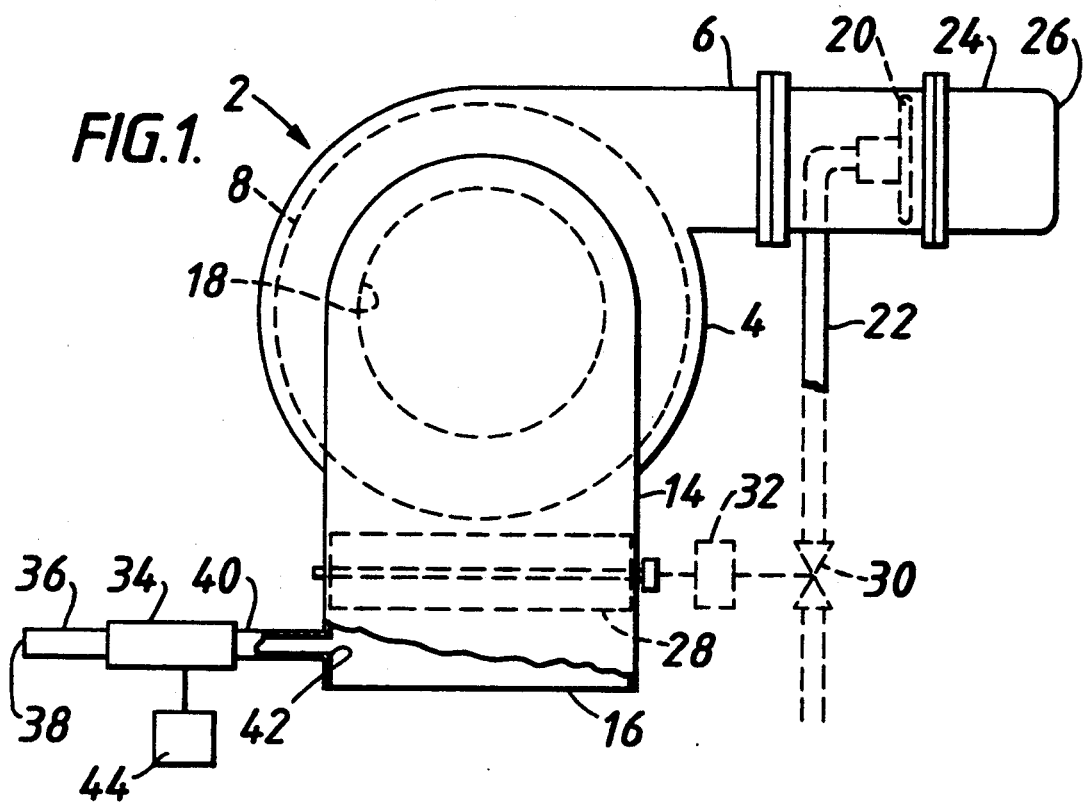
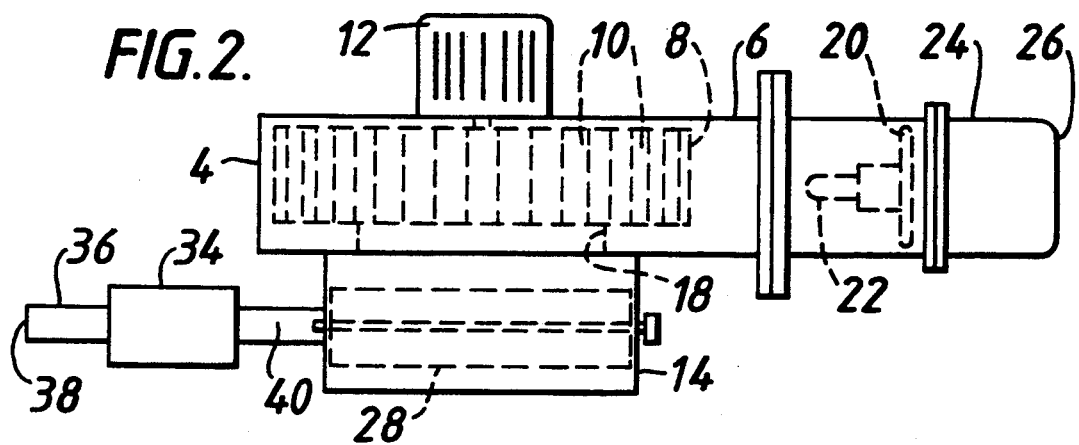
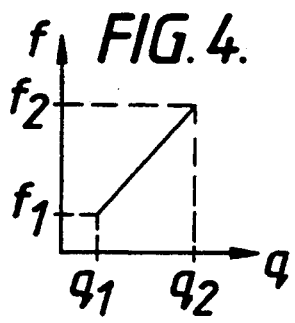
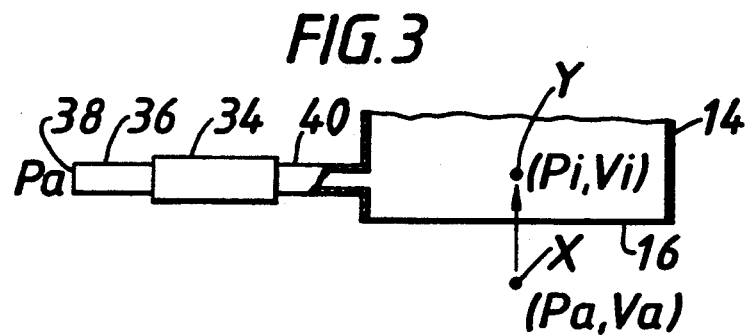

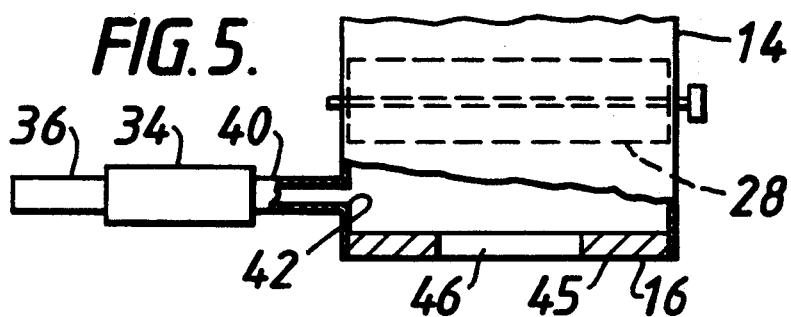
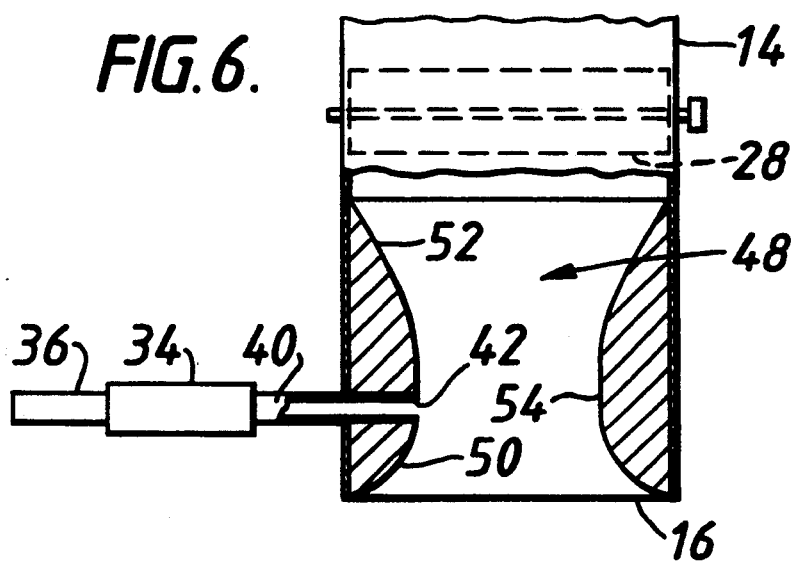
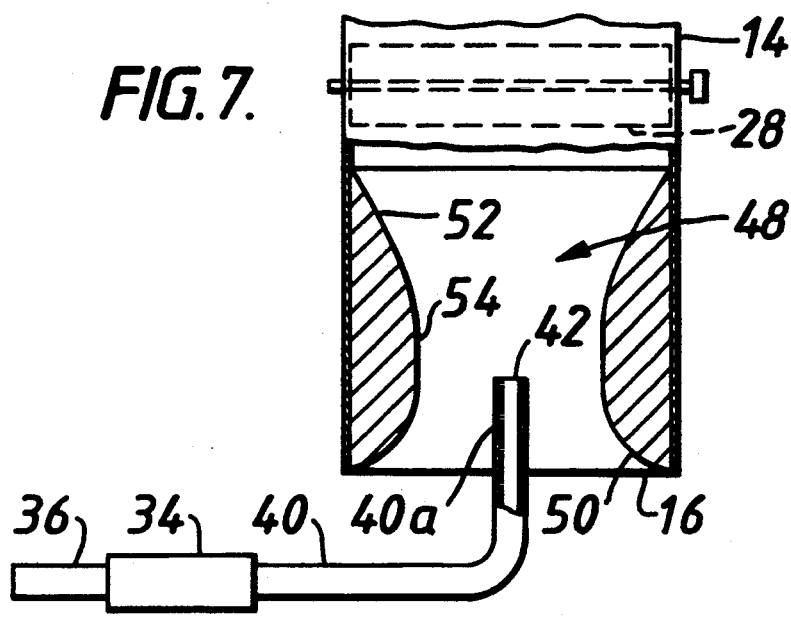

SUPPLYING FLUID

This application is a continuation of application Serial No. 07/841,472, filed Feb. 26, 1992, now abandoned.

BACKGROUND OF THE INVENTION

This invention concerns a method and apparatus for supplying fluid to a desired point and making a measure of the amount of fluid supplied.

SUMMARY OF THE INVENTION

According to a first aspect of the invention there is provided a method of supplying fluid to a desired point and making a measure of the amount of fluid supplied, said method comprising providing conduit means having fluid admittance means opening into a fluid in a fluid reservoir for admitting said fluid from said reservoir into said conduit means, inducing a continuous flow of said fluid along said conduit means from said reservoir to said desired point, providing a fluidic oscillator having an inlet which opens to said fluid in said reservoir and an outlet which opens into said conduit means whereby the same cause which induces said continuous flow of fluid along said conduit means also induces continuous flow of fluid from said reservoir through said fluidic oscillator, and measuring the frequency of oscillation of said fluidic oscillator whereof said frequency is a function of the amount of said fluid flowing through said fluidic oscillator and is also a function of the amount of said fluid flowing along said conduit means.

According to a second aspect of the invention there is provided apparatus for supplying fluid to a desired point and making a measure of the amount of fluid supplied, said apparatus comprising conduit means having fluid admittance means for opening into fluid in a fluid reservoir for admitting said fluid from said reservoir, inducing means for inducing a continuous flow of said fluid along said conduit means from said reservoir to said desired point, a fluidic oscillator having an inlet for opening into said fluid in the reservoir and an outlet which opens into said conduit means so that said inducing means will also induce continuous flow of said fluid from said reservoir through said fluidic oscillator, and frequency measuring means for measuring the frequency of oscillation of said fluidic oscillator whereof said frequency is a function of the amount of fluid flowing through said fluidic oscillator and is also a function of the amount of said fluid flowing along said conduit means.

A fluidic oscillator is a device which produces oscillations when it is energised by a flow of fluid through the device, the frequency of the oscillations being a function of the flow rate of the fluid. An example of a suitable fluidic oscillator is described in GB 1,453,587 (U.S. Pat. No. 3,902,367).

The fluid concerned can be a gas or a liquid. The reservoir may surround the conduit means and the fluidic oscillator.

The fluid concerned can be air in which case the reservoir may be the atmosphere.

BRIEF DESCRIPTION OF THE DRAWINGS

The invention will now be further described, by way of example, with reference to the accompanying drawings in which:

FIG. 1 is a side view, partially fragmented, of a fluid fuelled package burner formed according to the second aspect of the invention and supplied with combustion air by the method according to the first aspect;

FIG. 2 is a plan view of the package burner in FIG. 1;

FIG. 3 is a fragment of the package burner in FIG. 1 to illustrate a mathematical basis which shows that the amount of combustion air entering the package burner can be measured using the fluidic oscillator;

FIG. 4 is a graph showing a relationship between the frequency f of oscillation of the fluidic oscillator in FIG. 1 and the flow rate q (in units of volume pet unit time) of fluid flowing though the fluidic oscillator over a given range of flow rates;

FIG. 5 shows, partially fragmented, a modification to the package burner in FIG. 1;

FIG. 6 shows, partially fragmented, another modification to the package burner in FIG. 1, and FIG. 7 shows, partially fragmented, a further modification to the package burner in FIG. 1.

DETAILED DESCRIPTION OF PREFERRED EMBODIMENTS

With reference to FIGS. 1 and 2 a package burner 2 comprises a circular fan housing 4 with a tagential air outlet passage 6. The housing 4 contains a rotatably mounted fan 8 in the form of a drum with blades 10 which is rotatably driven by an electric motor 12 so that combustion air drawn into the centre of the drum fan 8 is expelled at the periphery down the outlet passage 6. An air inlet conduit 14 is provided on the side of the housing 4. This conduit has an open end 16 of substantially rectangular cross-section opening to atmospheric air. At its other end the conduit 14 opens through a circular opening 18 in the housing 4 into the interior thereof so that the continuous flow of combusion air induced by the fan 8 along the conduit 14 enters the centre of the fan in a stream flowing axially with respect to axis of fan rotation. The outlet passage 6 contains a fluid fuel supply nozzle 20 connected to a fuel supply pipe 22 along which a combustible fluid fuel is supplied to the nozzle. The fluid fuel can be a fuel gas, for example natural gas. The fuel from the nozzle 20 mixes with the combustion air from the fan 8 and burns in a combustion chamber 24 from which flames issue at its open end 26.

Normally the fan 8 is driven at a substantially constant speed by the motor 12. The amount of combustion air delivered to the fuel nozzle 20 can be varied by air control valve means, for example a butterfly valve 28 positioned in the conduit 14. Alternatively the butterfly valve may be positioned in the outlet passage 6.

In smaller package burners either no fuel is supplied to the nozzle 20 or it is supplied at a pre-determined fixed rate according to the setting of a fuel control valve 30 which is pre-set. Also the extent to which the butterfly valve 28 is open is also pre-set and thus fixed.

For larger package burners the fuel control valve 30 may be opened or closed to any desired extent, in the course of use, to vary the heat output from the burner. In this case the butterfly valve 28 can be linked, for example by a mechanical link 32, with the fuel valve 30 so that the supply of combustion air to the nozzle 20 is varied in accordance with the amount of fuel supplied.

A fluidic oscillator 34 is provided. This can be of the kind described in GB 1,453,587 (U.S. Pat. No. 3,902,367). The fluidic oscillator has an inlet pipe 36 opening at its end 38 to the atmospheric air. An outlet pipe 40 leads from the fluidic oscillator 34 and has an end 42 opening into the conduit 14 downstream (with respect to the direction of air flow induced by along the conduit 14 by the fan 8) from the conduit's open end 16. The open end 42 has an axis (along which the airflow in the outlet pipe 40 travels) which is preferably but not essentially at substantially 90° to the direction of air flow along the conduit 14 passed the end 42. Between the pipes 36 and 40 the fluidic oscillator comprises passage means into which a stream of air issues through a nozzle after passing along the pipe 36. The stream of air flows along one or other of first and second opposite sides of the passage means flipping back and forth from one said side to the other with a frequency f which is a function of the flow rate q of the air in the stream passing through the fluidic oscillator. As shown in FIG. 4 the frequency f of the fluidic oscillator typically varies linearly with the flow rate q over the range of flow rates $q_1$ to $q_2$. Thus when the oscillator has a particular frequency within the range $f_1$ to $f_2$, this corresponds with a particular flow rate within the range $q_1$ to $q_2$. The frequency of the fluidic oscillator is measured by frequency measuring apparatus 44. The apparatus 44 comprises pressure or flow observing means disposed adjacent to one or both said sides of the passage means in the fluidic oscillator to observe the occurrence of change in the air pressure or air flow at the observing means when the stream of air flips from one side of the passage means to the opposite side. The number of times a pressure or flow change is observed within a given time period is a measure of the frequency of the oscillator.

By Bernoulli's Law relating to fluids, $$Ps + \tfrac{1}{2}\rho V^2 = C \tag{1}$$

where Ps is the static pressure, $\rho$ is the fluid density, V is the fluid velocity, and C is a constant.

Turning to FIG. 3, where X is a point in the atmospheric air reservoir outside the package burner 2 (FIG. 1), then at point X Pa is the static pressure of the atmospheric air, and Va is the velocity of the atmospheric air. Y is a point in the air inlet conduit 14 to the package burner, and at point Y Pi is the static pressure in the inlet conduit and Vi is the air velocity.

Now since by virtue of equation (1) $Pa + \tfrac{1}{2}\rho Va^2 = C$, and $Pi + \tfrac{1}{2}\rho Vi^2 = C$, where $\rho$ is the density of air, we get $$Pa + \tfrac{1}{2}\rho Va^2 = Pi + \tfrac{1}{2}\rho Vi^2 \tag{2}$$

But since $Va = 0$, identity (2) becomes $Pa \equiv Pi + \tfrac{1}{2}\rho Vi^2$ which, when rearranged, becomes $$(Pa - Pi) \equiv \tfrac{1}{2}\rho Vi^2 \tag{3},$$

it being remembered that operation of the fan causes a drop in the static pressure in the conduit 14, and thus $Pa > Pi$.

The flow rate q of air through the fluidic oscillator 34 is a function of the pressure difference $(Pa - Pi)$ where Pa is the static pressure of atmospheric air not only at point X but also adjacent to the end 38 of the inlet pipe 36. Since the identity (3) shows that $(Pa - Pi) \equiv \tfrac{1}{2}\rho Vi^2$, then it follows that the flow rate q is a function of $Vi^2$ or Vi.

The fluidic oscillator 34 gives a frequency reading f which is a function of q and therefore of Vi. The flow rate Q of air flowing along the inlet conduit 14 is a function of Vi, therefore frequency f is a function of Q.

Accordingly the apparatus can be calibrated so that each value in the range $f_1$ to $f_2$ corresponds to a particular value for Q the flow rate of air along the conduit 14. Flow rate q through the fluidic oscillator 34 is small compared with the flow rate Q along the conduit 14.

By comparison with the volumetric capacity of the conduit 14 (which is greater than the capacity of the fluidic oscillator 34 and the pipes 38 and 40), the volume of fluid in the reservoir (in this example the volume of air constituting the atmosphere) is considerably greater than the capacity of the conduit 14.

It will be appreciated that the aforedescribed method can be used to measure the flow rate of any fluid induced to flow along a conduit where the inlet to the conduit and the inlet to a fluidic oscillator both open to fluid in the same reservoir of fluid, and the outlet from the fluidic oscillator opens into the conduit.

A fluidic oscillator will cease to function below a minimum critical flow rate. To increase the flow rate q through the fluidic oscillator 34 to increase the range of flow rates Q along the conduit 14 over which range the fluidic oscillator frequency f varies with respect to the flow rate q, a restriction may be provided at the inlet end 16 to the conduit 14 so that, according to Bernoulli's Law equation (1) above, the restriction causes an increase in the air velocity Vi in FIG. 3 (just downstream of the restriction) and thus a decrease in the static pressure Pi. This causes an increase in the pressure difference $Pa - Pi$ in identity (3) above. Some ways in which restriction may be provided are illustrated in FIGS. 5, 6 and 7.

In FIG. 5 the size of the entrance to the conduit 14 is reduced by the provision at the inlet end 16 of a restrictor plate 45 having an orifice 46 therethrough, the size or cross-sectional area of the orifice 46 being less than that of the conduit 14 without the plate 45. In this case the end 42 from the outlet pipe 40 from the fluidic oscillator opens into the conduit 14 downstream of and adjacent to the restrictor plate 45.

In FIG. 6 the restriction at the inlet end 16 to the conduit 14 is a venturi 48 having a convergent section 50 and a divergent section 52 and a narrow or throat section 54 between the other two sections. The end 42 of the fluidic oscillator outlet pipe 40 opens into the verturi passage at the throat section, the axis of the open end 42 being at substantially 90° to the axis of the venturi passage. In FIG. 7 outlet pipe 40 from the fluidic oscillator has a cranked end length 40a extending along the air flow direction through the venturi and ending at the open end 42 which is disposed in the venturi throat 54 and faces along the air flow direction through the venturi.

I claim:

1. A method of supplying fluid to a desired point and making a measure of the amount of fluid supplied, said method comprising providing conduit means having fluid admittance means opening into fluid in a fluid reservoir for admitting said fluid from the reservoir into said conduit means, wherein the volume of fluid in said reservoir is considerably greater than the volumetric capacity of said conduit means, inducing a continuous flow of said fluid along said conduit means from said reservoir to said desired point, providing a fluidic oscillator which is only in fluid flow communication with said conduit means through an outlet from said fluidic oscillator, said fluidic oscillator having an inlet which opens to said fluid in said reservoir and having said outlet which opens into said conduit means downstream, with respect to induced fluid flow along said conduit means, of said fluid admittance means whereby the same cause which induces said continuous flow of fluid along said conduit means also induces continuous flow of fluid from said reservoir through said fluidic oscillator, said conduit means having a volumetric capacity a plurality of times greater than that of said fluidic oscillator, and measuring the frequency of oscillation of said fluidic oscillator in which said frequency of oscillation being measured is the frequency at which a stream of said fluid flips back and forth between opposite sides of passage means in said fluidic oscillator and whereof said frequency is a function of the amount of said fluid flowing through said fluidic oscillator and is also a function of the amount of said fluid flowing along said conduit means.

2. A method according to claim 1, wherein said fluid in said reservoir surrounds said conduit means and at least said inlet to said fluidic oscillator.

3. A method according to claim 1, wherein said fluid is gaseous.

4. A method according to claim 3, wherein said gaseous fluid is air.

5. A method according to claim 4, wherein said fluid reservoir is the earth's atmosphere.

6. A method according to claim 1, wherein suction means acting on said conduit means induces said continuous flow of said fluid along said conduit means from said reservoir and induces said continuous flow of said fluid from said reservoir through said fluidic oscillator.

7. A method according to claim 6, wherein said suction means comprises a driven, rotary fan.

8. A method according to claim 1, wherein said fluid is air, and said fluid reservoir is the earth's atmosphere, and said air is induced in a continuous flow along said conduit means and is supplied as combustion air and mixes with a supply of combustible fuel for burning.

9. A method according to claim 8, wherein said combustible fuel is fuel gas.

10. A method according claim 1, wherein said fluid flow along said conduit means passes through fluid flow restriction means with which said conduit means is provided.

11. A method according to claim 10, wherein said fluid flow restriction means comprises a plate having at least one orifice therethrough for passage of said fluid through said orifice.

12. A method according to claim 10, wherein said fluid flow restriction means comprises a venturi arrangement.

13. Apparatus for supplying fluid to a desired point and making a measure of the amount of fluid supplied, said apparatus comprising conduit means having fluid admittance means for opening into fluid in a fluid reservoir and for admitting said fluid from said reservoir to said conduit means, wherein the volumetric capacity of said reservoir is considerably greater than the volumetric capacity of said conduit means, inducing means for inducing a continuous flow of said fluid along said conduit means from said reservoir to said desired point, a fluidic oscillator which is only in fluid flow communication with said conduit means through an outlet from said fluidic oscillator, said fluidic oscillator having an inlet for opening into said fluid in said reservoir and having said outlet which opens into said conduit means downstream, with respect to induced fluid flow along said conduit means, of fluid admittance means whereby said inducing means will also induce continuous flow of said fluid from said reservoir through said fluidic oscillator, said conduit means having a volumetric capacity a plurality of times greater than that of said fluidic oscillator, and frequency measuring means for measuring the frequency of oscillation of said fluidic oscillator in which said frequency of oscillation is the frequency at which a stream of said fluid flips back and forth between opposite sides of passage means in said fluidic oscillator and whereof said frequency is a function of the amount of said fluid flowing through said fluidic oscillator and is also a function of the amount of said fluid flowing along said conduit means.

14. Apparatus according to claim 13, wherein said fluid in said reservoir surrounds said conduit means and at least said inlet to said fluidic oscillator.

15. Apparatus according to claim 13, wherein said fluid is gaseous.

16. Apparatus according to claim 15, wherein said fluid is air.

17. Apparatus according to claim 16, wherein said reservoir is the earth's atmosphere.

18. Apparatus according to claim 13, wherein said inducing means comprises suction means.

19. Apparatus according to claim 18, wherein said suction means comprises a driven, rotary fan.

20. Apparatus according to claim 13 in the form of a burner further comprising fuel supply means to supply combustible fuel, and wherein said admittance means and said inlet are both open to the earth's atmosphere for air to be induced in a continuous flow along said conduit means for supply as combustion air for mixing with a supply of said combustible fuel for burning and for air to be induced in a continuous flow through said fluidic oscillator.

21. Apparatus according to claim 20, wherein said combustible fuel is fuel gas.

22. Apparatus according to claim 13, wherein said conduit means comprisies fluid flow restriction means for providing restriction to said fluid flow along said conduit means.

23. Apparatus according to claim 22, wherein said fluid flow restriction means comprises a plate having at least one orifice therethrough for passage of said fluid through said orifice.

24. Apparatus according to claim 22, wherein said fluid flow restriction means comprises a venturi arrangement.

25. A package burner comprising apparatus according to claim 20, wherein said fuel supply means comprises fuel supply nozzle means for emitting fuel for mixing with said combustion air in a chamber.

* * * * *